(No Model.)
W. F. ASHCROFT.
CARPET STRETCHER.
No. 270,720. Patented Jan. 16, 1883.
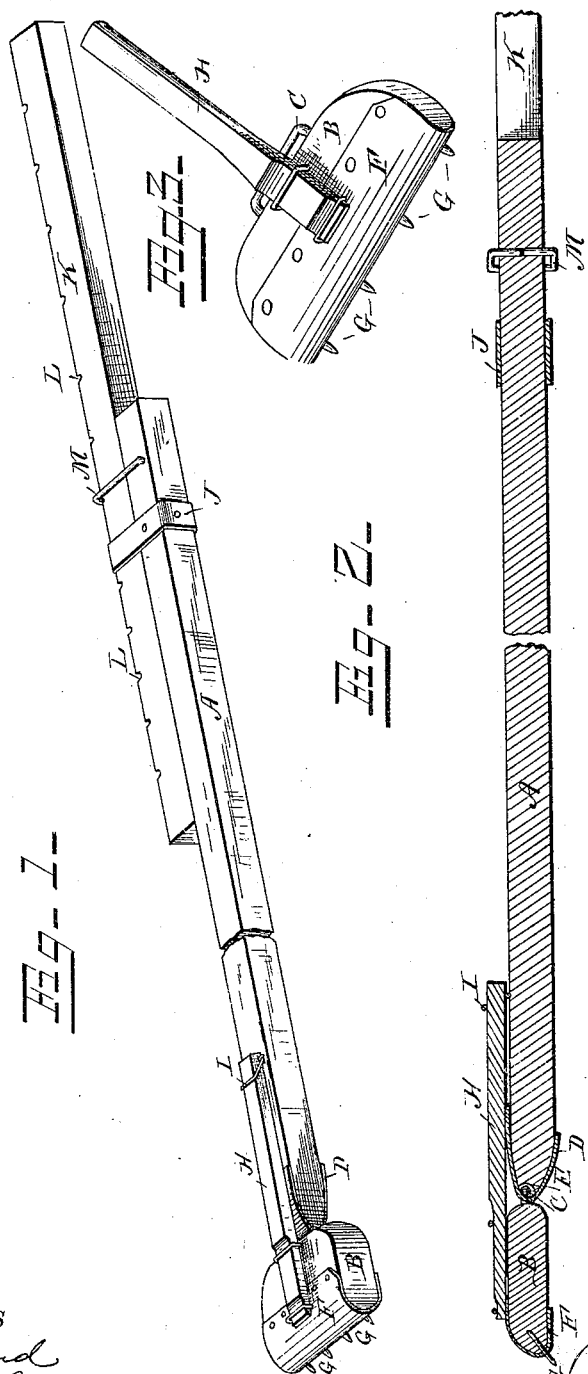
WITNESSES
INVENTOR
N. PETERS, Photo-Lithographer, Washington, D. C.

UNITED STATES PATENT OFFICE.

WILLIAM F. ASHCROFT, OF LOVELY DALE, INDIANA.

CARPET-STRETCHER.

SPECIFICATION forming part of Letters Patent No. 270,720, dated January 16, 1883.

Application filed November 9, 1882. (No model.)

*To all whom it may concern:*

Be it known that I, WILLIAM F. ASHCROFT, a citizen of the United States, residing at Lovely Dale, in the county of Knox and State of Indiana, have invented a new and useful Carpet-Stretcher, of which the following is a specification, reference being had to the accompanying drawings.

Figure 1 is a perspective view of my improved carpet-stretcher. Fig. 2 is a longitudinal sectional view, and Fig. 3 is a detail view of the hinged toothed jaw.

The same letters refer to the same parts in all the figures.

This invention relates to carpet-stretchers; and it consists in certain improvements in the construction of the same, which will be hereinafter fully described, and particularly pointed out in the claims.

In the drawings, A represents a bar or handle of suitable dimensions, preferably of sufficient length to extend about half-way across an ordinary room. Hinged to the front end of said bar or handle is a jaw, B, consisting essentially of a flat plate provided at its rear edge with a bail, C, to receive the hinge-strap D, by which it is connected to the bar or handle. The latter is provided at its front end with a groove or recess, E, to receive the bail C, as shown. The front edge of the jaw B is curved or rounded, so as to present a smooth surface, and it is covered with a sheathing of sheet metal, F.

G G are teeth or barbs driven in the front edge of the jaw B and extending through holes in the sheet-metal sheathing, which serve to brace and sustain said points and prevent them from bending or breaking.

Secured to the upper side of the jaw B is a lever, H, the end of which, when lowered, may be inserted under and held by a bail, I, pivoted to the bar or handle A.

The handle A is provided with one or more laterally-projecting clamps, J, to receive a sliding bar, K, the outer edge of which is provided with a series of grooves or recesses, L.

M is a bail pivoted to the handle A, and encircling and engaging the grooves L in the bar K, which latter may thus be held securely in any position to which it may be adjusted in relation to the handle A.

The operation of my invention will be readily understood. The carpet having been tacked at one edge, the stretcher is adjusted transversely across the room, with the rear end of bar K bearing against the wall at which the carpet has been tacked, and the hinged jaw B within a short distance of the opposite wall. The hinged jaw is then placed in a vertical position, so as to cause the teeth G to engage the carpet. The lever H is then lowered and made fast by the bail I, thus stretching the carpet and holding it while being tacked.

I claim as my invention—

1. In a carpet-stretcher constructed substantially as described, the hinged jaw B, having smooth, rounded edge covered by a sheet-metal sheathing, and provided with teeth or points extending through and braced by the said sheathing, as set forth.

2. In a carpet-stretcher, the combination, with an arm or handle, A, having pivoted bail I, of the hinged jaw B, having smooth, rounded front edge provided with sheathing F and teeth G, and the lever H, as set forth.

3. The combination, with the handle A, having groove or recess E, of the hinged jaw B, having bail C, and the hinge-strap D, as set forth.

4. The herein-described improved carpet-stretcher, consisting of the handle A, having laterally-projecting clamps J, hinged toothed jaw B, having lever H, and pivoted latch-bail I, in combination with the longitudinally-sliding bar K, having grooves or recesses L engaging a bail, M, which encircles the bar K and is pivoted to handle A, as set forth.

In testimony that I claim the foregoing as my own I have hereto affixed my signature in presence of two witnesses.

WILLIAM F. ASHCROFT.

Witnesses:
  GEORGE TURLETT,
  JAMES TURLETT.